Feb. 11, 1969  E. H. JOHNSON  3,426,667
AIR INTAKE APPARATUS
Filed March 17, 1967
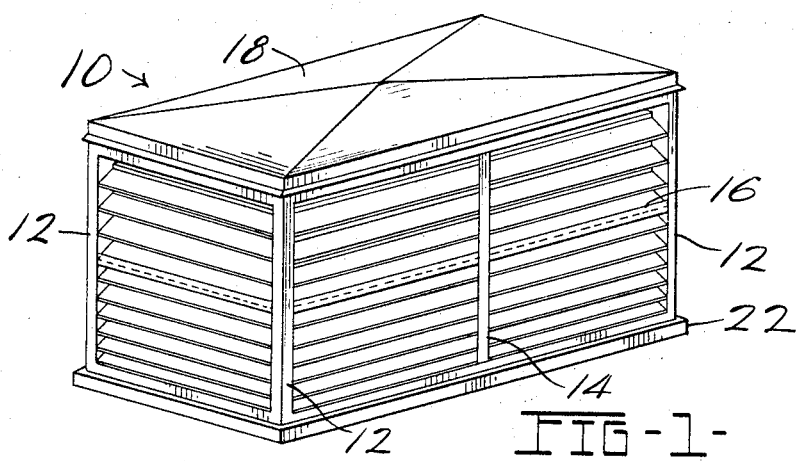
FIG-1-
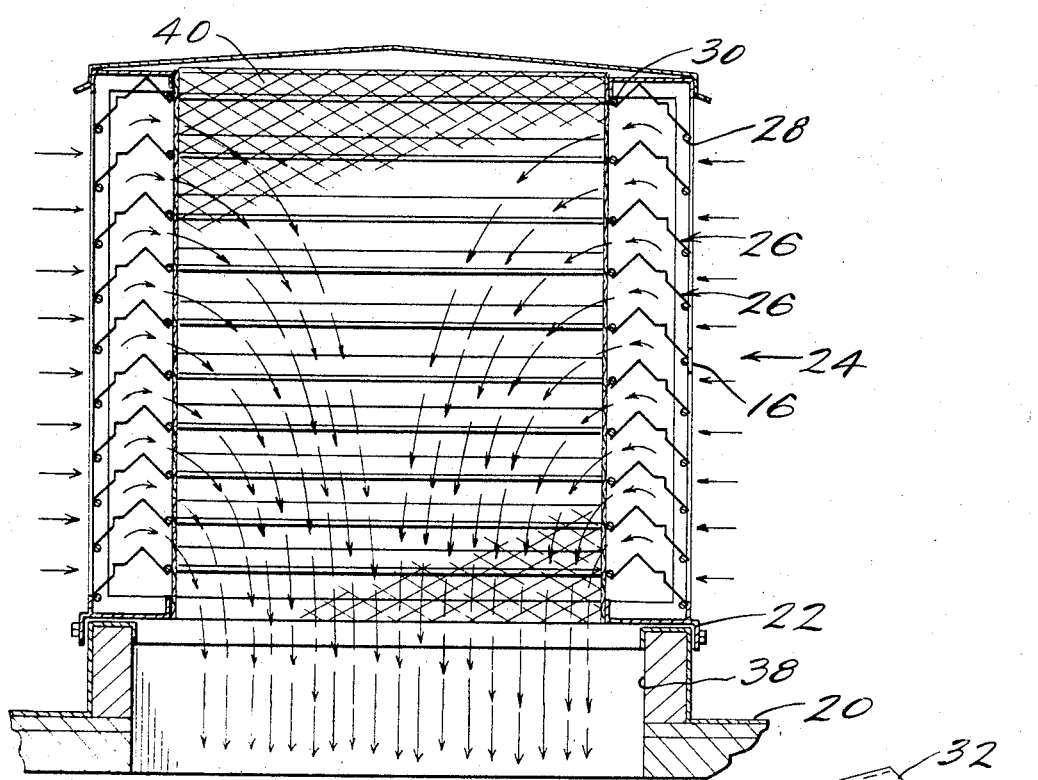
FIG-2-
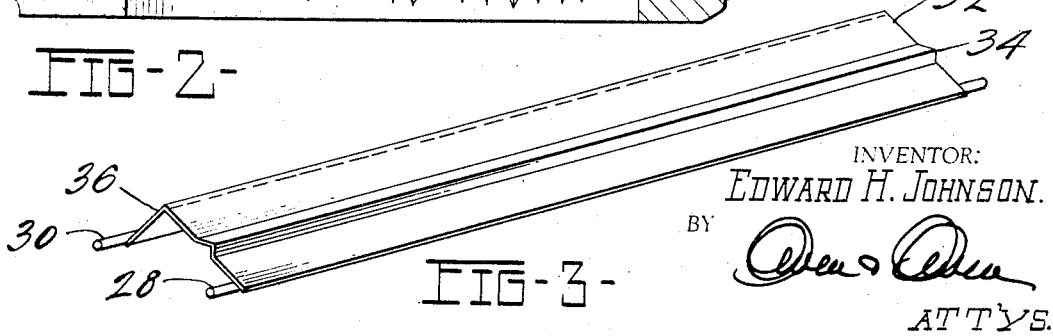
FIG-3-
INVENTOR:
EDWARD H. JOHNSON.
BY
ATTYS.

United States Patent Office 3,426,667
Patented Feb. 11, 1969

3,426,667
AIR INTAKE APPARATUS
Edward H. Johnson, Maumee, Ohio, assignor to The American Warming & Ventilating, Inc., Toledo, Ohio, a corporation of Ohio
Filed Mar. 17, 1967, Ser. No. 623,937
U.S. Cl. 98—37    7 Claims
Int. Cl. F24f 7/00, 13/08

ABSTRACT OF THE DISCLOSURE

A penthouse through which air is drawn and directed downwardly. A considerable amount of turbulence is usually encountered in penthouses and this is overcome in part by employing direction vanes of the penthouse blades. Further, the blades are spaced closer together at the bottom of the penthouse than at the top so that air is drawn past all of the blades more uniformly. With this arrangement, the air intake volume is also less at the bottom than otherwise so that there is less tendency for rain, etc. to be drawn past the blades at the bottom.

---

This invention relates to a structure in the nature of a penthouse, louver, shutter, damper, etc. through which air passes more uniformly and with less turbulence.

An air flow structure according to the invention is employed when the air passing through the structure is changed to a direction transverse to a line perpendicular to a plane through the structure. The invention is particularly useful for penthouses in which air is drawn into the penthouse from opposite sides, usually from four sides, and is directed downwardly through a roof opening and into a building therebelow. In penthouses, a considerable amount of turbulence is normally experienced as the air is directed inwardly and upwardly into the penthouse where it meets and mixes with air coming from the opposite direction. This turbulence necessarily increases the pressure drop through the penthouse. In addition, with penthouses, there is a substantially increased tendency for more air to be drawn through the blades at the bottom lower portion than the upper portion. This results in increased velocity of the air at the bottom and causes more rain, snow, etc. to be drawn into the penthouse than would result with slower, more uniform air velocities over the entire intake surfaces of the penthouse.

According to the invention, each of the blades of the penthouse is provided with a vane which is at an angle to the main portion of the blade and directs the air downwardly through the penthouse. The air entering the penthouse does not oppose other air from the opposite direction but, rather, blends with the other air which is directed downwardly in the same direction. Also, the blades of the penthouse are spaced farther apart at the upper portion thereof than at a lower portion to achieve more uniform flow of air into the penthouse over the intake surfaces thereof. For a given volume, the maximum velocity of air flow through the penthouse blades is thereby decreased, along with foreign material such as rain entrained with the air.

It is therefore, a principal object of the invention to provide an air flow structure having the advantages outlined above.

Another object of the invention is to provide a penthouse in which less turbulence occurs and into which the air is drawn more uniformly.

Other objects and advantages of the invention will be apparent from the following detailed description of a preferred embodiment thereof, reference being made to the accompanying drawings, in which:

FIG. 1 is a view in perspective of a penthouse embodying the invention;
FIG. 2 is an enlarged view in vertical cross section through the penthouse shown in FIG. 1; and
FIG. 3 is a view in perspective of a penthouse blade used with the penthouse of FIGS. 1 and 2.

A penthouse 10 in FIG. 1 includes corner frame members 12 and central frame members or mullions 14 with horizontal dividers 16, if necessary. A cover 18 is provided on the penthouse which is preferably mounted above a building roof 20 (FIG. 2) on a suitable base 22.

Each of the faces of the penthouse 10 is formed by an air intake structure or louver 24. Each of the louvers 24 includes a plurality of blades 26 which can be mounted on stiffening bars or rods 28 and 30 supported by the corner frame members 12. These can also be supported by the mullions 14, particularly for wider louvers. Each of the blades 26 includes a main portion 32 having an upwardly-extending ridge 34 which aids in preventing water or the like from travelling up the blade and to the interior of the penthouse 10. The ridge 34 also acts as a stiffener for the blade. Each of the blades also includes an air-directing vane 36 at the upper edge portion of the blade, with the vane 36 directed downwardly to aid in establishing a downward flow of air into the penthouse and downwardly through a roof opening 38. While the vanes 36 are all shown as being at right angles to the main portion 32 of the blades 26, it is also possible for the angles to vary somewhat, for example, being at acute angles to the main portions of the blades at the upper parts of the penthouse and at shallower, obtuse angles at the lower parts thereof. The vanes 36 are important in directing the air downwardly and preventing a substantial amount of turbulence in the upper portion of the penthouse as otherwise occurs when the air is directed inwardly and upwardly by the main portions 32 of the blades, causing the air to meet in the center with substantial mixing and turbulence.

Also in accordance with the invention, the blades 26 are spaced progressively farther apart in a direction away from the direction in which the air flows after passing through the blades 26. By way of example, the blades are spaced apart a vertical distance of three-and-one-half inches at the bottom of the penthouse and a maximum distance of four-and-one-sixteenth inches at the upper portion thereof, in the case of a penthouse which is approximately four feet high. The progressive spacing need not increase uniformly, of course, but can increase in steps, with several blades being the same distance apart and the next several blades being an increased distance apart, with the next group of blades above that still farther apart, etc. The spacing should progress, in any event, from the lower portion of the penthouse to the upper portion.

In all instances, however, the forward, lower edge of each blade is no higher than the upper portion of the blade immediately therebelow. This prevents the formation of a direct passage into the louver which would increase the chance for precipitation, etc. to enter the penthouse.

A suitable grid 40 can be located behind each set of louver blades to keep out birds, etc.

The unusual new construction, developed after a series of tests, makes possible the equalizing of throat intake volume by lowering the velocity at the base of the unit and permitting planned, uniform distribution of air over the entire surface. In addition pressure drop characteristics are considerably improved.

Various modifications of the above described embodiment of the invention will be apparent to those skilled in the art, and it is to be understood that such modifications can be made without departing from the scope of the

I claim:

1. An air flow penthouse structure comprising frame means forming an opening, means forming a passage on one side of said opening and extending transversely to a line perpendicular to the plane of the opening, a plurality of blades extending across said opening and extending transversely to the passage, said blades having air directing means at angles to main portions of the blades for directing air generally in the direction of the passage, said blades being spaced farther apart at portions of the structure away from the direction in which air flows in said passage, said frame means and said blades forming a multi-sided penthouse.

2. A structure according to claim 1 wherein said blades are spaced farther apart at the upper portion of the penthouse than at the lower portion.

3. A structure according to claim 1 wherein said blades are spaced apart at progressively increasing intervals from the bottom of the penthouse to the top.

4. A structure according to claim 1 wherein said blades are spaced farther apart at progressively increasing, uniform intervals.

5. A structure according to claim 1 wherein each of said blades has an upwardly projecting ridge extending longitudinally thereof.

6. A structure according to claim 1 wherein a portion of each blade is no higher than a portion of the blade immediately therebelow.

7. An air intake structure comprising frame means forming an intake opening, means forming a passage on one side of said opening for receiving air from said opening, said passage extending substantially vertically downwardly from said structure and positioned transversely to a line perpendicular to the plane of the opening, a multiplicity of blades extending across said opening and extending transversely to the passage in a manner to initially direct air generally upwardly as it flows into said structure between the blades, said blades having vanes to subsequently direct the air downwardly toward said passage, said blades being spaced increasingly farther apart at increasing intervals, toward the top of said opening from the bottom.

References Cited

UNITED STATES PATENTS

| | | | |
|---|---|---|---|
| 1,394,735 | 10/1921 | Jordan | 98—42 XR |
| 2,201,437 | 5/1940 | Rice | 49—74 XR |
| 2,566,156 | 8/1951 | Apolonio | 98—121 XR |
| 2,737,876 | 3/1956 | Smith | 98—121 XR |
| 2,868,106 | 1/1959 | Knutson et al. | 98—43 |
| 3,216,161 | 11/1965 | Forsman | 98—46 XR |

OTHER REFERENCES

"Extruded Aluminum Louvers," publication by Construction Specialties, Inc. of Newark, N.J., copyright 1954, pp. 8 and 9 relied upon.

ROBERT A. O'LEARY, *Primary Examiner.*

M. A. ANTONAKAS, *Assistant Examiner.*

U.S. Cl. X.R.

98—121